United States Patent
Kim

(10) Patent No.: US 7,280,135 B2
(45) Date of Patent: Oct. 9, 2007

(54) PIXEL ARRAY, IMAGE SENSOR HAVING THE PIXEL ARRAY AND METHOD FOR REMOVING FLICKER NOISE OF THE IMAGE SENSOR

(75) Inventor: Chae-Sung Kim, Kyoungki-do (KR)

(73) Assignee: Hynix Semiconductor Inc., Kyoungki-Do (KR)

( * ) Notice: Subject to any disclaimer, the term of this patent is extended or adjusted under 35 U.S.C. 154(b) by 735 days.

(21) Appl. No.: 10/630,194

(22) Filed: Jul. 30, 2003

(65) Prior Publication Data

US 2004/0080630 A1    Apr. 29, 2004

(30) Foreign Application Priority Data

Oct. 10, 2002    (KR)    ............ 10-2002-0061734

(51) Int. Cl.
*H04N 9/73*    (2006.01)
(52) U.S. Cl. .................................... 348/228.1
(58) Field of Classification Search .. 348/226.1–228.1, 348/222.1, 362–364, 296–299; 708/403–409
See application file for complete search history.

(56) References Cited

U.S. PATENT DOCUMENTS

| | | | |
|---|---|---|---|
| 4,117,541 A * | 9/1978 | Ali .......................... 708/320 |
| 5,293,238 A | 3/1994 | Nakano et al. | |
| 6,271,884 B1 * | 8/2001 | Chung et al. ............ 348/370 |
| 6,295,085 B1 * | 9/2001 | Munson et al. ......... 348/226.1 |
| 6,501,518 B2 * | 12/2002 | Smith et al. ............ 348/425.3 |
| 6,710,818 B1 * | 3/2004 | Kasahara et al. ........ 348/607 |
| 6,999,118 B2 * | 2/2006 | Suzuki .................... 348/226.1 |
| 7,034,870 B2 * | 4/2006 | Nagaoka et al. ....... 348/228.1 |
| 2002/0044205 A1 | 4/2002 | Nagaoka et al. | |
| 2002/0158971 A1 * | 10/2002 | Daiku et al. ............ 348/226.1 |
| 2003/0030744 A1 * | 2/2003 | Baer ........................ 348/370 |
| 2004/0201729 A1 * | 10/2004 | Poplin et al. ............ 348/226.1 |

FOREIGN PATENT DOCUMENTS

WO    WO 200007363 A1 *    2/2000

OTHER PUBLICATIONS

Weisstein, Eric W. "Fast Fourier Transform." From MathWorld—A Wolfram Web Resource. http://mathworld.wolfram.com/FastFourierTransform.html Retrieved Mar. 23, 2007.*

* cited by examiner

*Primary Examiner*—Vivek Srivastava
*Assistant Examiner*—Timothy J Henn
(74) *Attorney, Agent, or Firm*—Marshall Gerstein & Borun LLP

(57) ABSTRACT

There are provided a pixel array capable of detecting and removing a flicker noise, an image sensor employing the pixel array and an automatic flicker noise detecting method capable of effectively detecting and removing the flicker noise of the image sensor. For the purpose, a pixel array of an image sensor includes a pixel group, having N×M number of unit pixels, for detecting an image signal, N and M being integers, and a pixel column, allocated along a row direction of the pixel group, for detecting an average frequency of a corresponding pixel row to thereby detect the flicker noise.

9 Claims, 7 Drawing Sheets

$$C_m = \sum_{K=0}^{K=N-1} Y_k \, e^{-j2\pi \cdot k \cdot m/255}$$

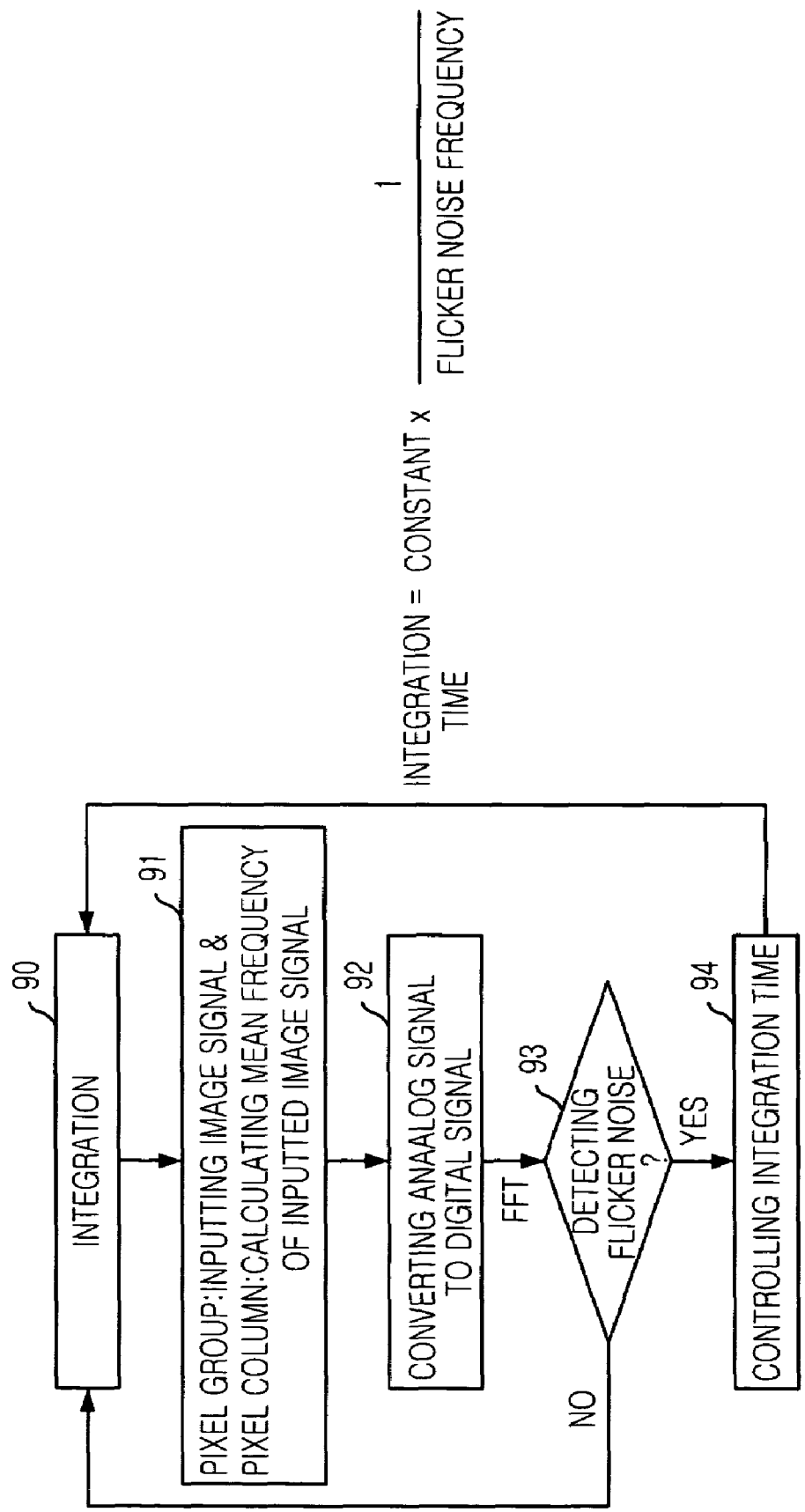

PIXEL ARRAY, IMAGE SENSOR HAVING THE PIXEL ARRAY AND METHOD FOR REMOVING FLICKER NOISE OF THE IMAGE SENSOR

FIELD OF THE INVENTION

The present invention relates to an image sensor; and, more particularly, to a unit pixel of an image sensor capable of automatically detecting and removing a flicker noise, the image sensor having the unit pixel and a method of removing the flicker noise of the image sensor.

DESCRIPTION OF RELATED ART

In general, an image sensor is a device that is capable of reproducing images by using a characteristic of a semiconductor reacting to light. In the image sensor, pixels detect different brightness and wavelengths of light emitted from different objects and read out electrical values from the detected values. The image sensor changes the electrical values into levels capable being signal-processed.

That is, the image sensor is a semiconductor device that changes an optical image into electrical signals.

A charge coupled device (CCD) is a device in which individual capacitors are located close to each other and electric charge carriers are stored at the capacitors and transmitted therethrough.

A CMOS image sensor is a device constructed from as many MOS transistors as the number of pixels by utilizing a CMOS technology using a control circuit and a signal processing circuit as peripheral circuits, and employing a switching scheme which detects image outputs sequentially by using the MOS transistors. The CMOS sensor is very useful to a personal communication system such as a mobile phone since it has an advantage low power consumption. Therefore, the image sensor is applicable to PC camera, medical equipments, toys, etc.

In the image sensor, a fixed pattern noise is caused by an offset voltage changing depending on a minute difference of a fabricating process. In order to compensate the fixed pattern noise, the image sensor employs a correlated double sampling (CDS) scheme that reads a reset voltage signal at each pixel in the pixel array 11 and a corresponding data voltage signal, and then outputs a difference of the reset voltage signal and the data voltage signal.

The image sensor captures images that are acceptable to a user by adjusting an exposure time and a gain according to the brightness of the surroundings of a camera and changing chrominance of the images properly since it has a feature of auto exposure.

However, without the exposure time changing in integer times of a period of a light source, there occurs a flicker noise at the CMOS image sensor in which pixels are exposed sequentially by lines. In order to overcome the occurrence of the flicker noise, when adjusting the exposure time, i.e., integration time, in integer times of the period of the light source, there occurs another problem, which is that the integration time should be changed depending on the change of a light source.

The light source is classified relative to the sun and a fluorescent lamp. Although a wavelength of fluorescent lamps are different depending on the countries or origin, a fluorescent lamp having 50 Hz or 60 Hz is usually used. Therefore, a frequency of the flicker noise is mostly 100 Hz or 120 Hz and thus there have been lots of efforts to detect the flicker noise. One of the efforts is to detect a peak value of an image and to calculate a period of the peak value, which is described in U.S. Pat. No. 6,295,085.

Since, however, it is very difficult to distinguish an image with a noise by simply detecting the peak value, the above method has not been used well practically.

It is, therefore, an object of the present invention to provide a pixel array capable of detecting and removing a flicker noise and an image sensor employing the pixel array.

Another object of the present invention is to provide an automatic flicker noise detecting method capable of effectively detecting and removing the flicker noise of the image sensor.

SUMMARY OF THE INVENTION

In accordance with one aspect of the present invention, there is provided a pixel array of an image sensor, comprising: a pixel group, including N×M number of unit pixels, for detecting an image signal, N and M being integers; and a pixel column, allocated along a row direction of the pixel group, for detecting an average frequency of a corresponding pixel row to thereby detect a flicker noise.

In accordance with another aspect of the present invention, there is provided an image sensor, comprising: a pixel array including a pixel group which has N×M number of unit pixels and detects an image signal and a pixel column, allocated along a row direction of the pixel group, for detecting an average frequency of a corresponding pixel row to thereby detect a flicker noise; an analog-to-digital converter for converting an analog signal provided from the pixel array to a digital signal; a flicker noise detector for performing the following equation and having a coefficient m of the following equation, which is a predetermined flicker noise frequency corresponding to the pixel column in one-to-one, thereby detecting a frequency component corresponding to the flicker noise from the digital signal, $$C_m = \sum_{k=0}^{k=N-1} Y_k e^{-j2\pi \cdot k \cdot m/255} \quad (m = \text{flicker noise frequency})$$

wherein $C_m$ represents a value of the pixel column including a Fourier-transformed frequency component; k is the number of sampling times; N is an integer; and $Y_k$ is a scalar value of the Fourier-transformed pixel column; and an integration time controller for removing the flicker noise by adjusting the integration time of the pixel array to a value corresponding to integer times of an inverse number of the frequency component since there exists the predetermined flicker noise frequency provided from the flick noise detector.

In accordance with still another aspect of the present invention, there is provided a method for removing a flicker noise of an image sensor, which includes a pixel array having a pixel group for image sensing and a pixel column allocated along a row direction of the pixel group so as to detect the flicker noise, comprising the steps of: (a) calculating an average frequency for a corresponding pixel row from the pixel column; (b) converting the average frequency to a digital signal; (c) performing the following equation for a predetermined flicker noise so as to detect a frequency component corresponding to the flicker noise from the digital signal, $$C_m = \sum_{k=0}^{k=N-1} Y_k e^{-j2\pi \cdot k \cdot m/255} (m = \text{flicker noise frequency})$$

wherein $C_m$ represents a value of the pixel column including a Fourier-transformed frequency component; k is the number of sampling times; N is an integer; and $Y_k$ is a scalar value of the Fourier-transformed pixel column; and (d) removing the flicker noise by adjusting the integration time of the pixel array to a value corresponding to integer times of an inverse number of the frequency component since there exists the predetermined flicker noise frequency.

BRIEF DESCRIPTION OF THE DRAWINGS

The above and other objects and features of the instant invention will become apparent from the following description of preferred embodiments taken in conjunction with the accompanying drawings, in which:

FIG. 9 is a flow chart showing a method for removing flicker noises of the image sensor in accordance with the present invention.

DETAILED DESCRIPTION OF THE INVENTION

Figure 1:
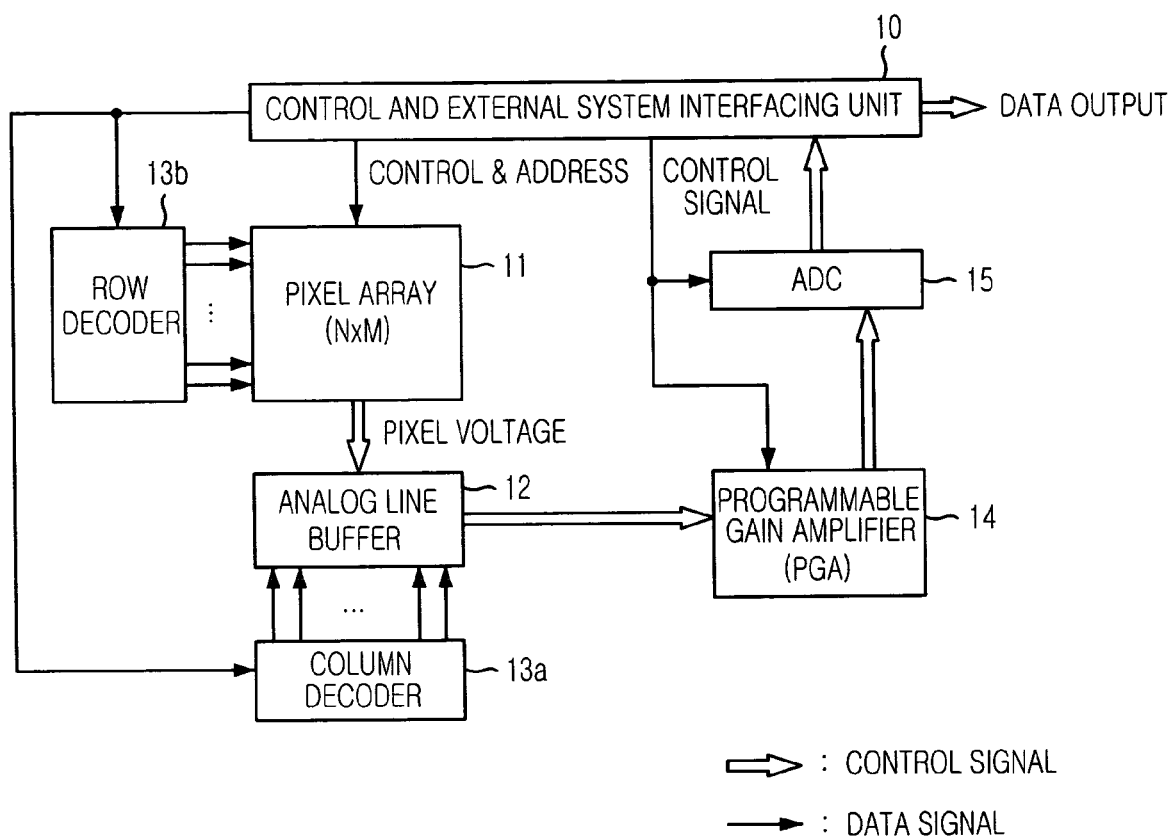
FIG. 1 shows a block diagram of a conventional image sensor.

Referring to FIG. 1, a block diagram of a conventional image sensor is shown. The conventional image sensor includes a control and external system interfacing unit 10, a pixel array 11, an analog line buffering unit 12, a column decoder 13a, a row decoder 13b, a programmable amplifying unit 14, and an analog to digital converter (ADC) 15.

Hereinafter, the operation of the conventional image sensor will be explained in detail.

The pixel array 11 has N×M pixels allocated horizontally and vertically to maximize the characteristic of responding to light, N and M being integers. The pixel array 11 is a core of the image sensor, which detects information for an image provided from the outside.

The control and external system interfacing unit 10 controls the entire operation of the image sensor by using a finite state machine (FSM), plays a role of an interface to an external system, and can program information related to various internal operations since it has allocation registers (not shown). Therefore, the control and external system interfacing unit 10 controls the entire operation of a chip according to the programmed information.

The analog line buffering unit 12 detects voltages of pixels on one selected column and stores the detected voltages. Among analog data stored at the analog line buffering unit 12, data selected by the column decoder 13a and the row decoder 13b is provided to the programmable amplifying unit 14 though an analog bus.

The programmable amplifying unit 14, e.g., a programmable gain amplifier (PGA), amplifies pixel voltages stored at the analog line buffering unit 12 in case the pixel voltages are low. The analog data amplified by the programmable amplifying unit 14 are color-interpolated and color-compensated and then converted to digital data by the ADC 15.

Hereinafter, a preferred embodiment of the present invention will be described in detail with reference to the accompanying drawings.

Figure 2:
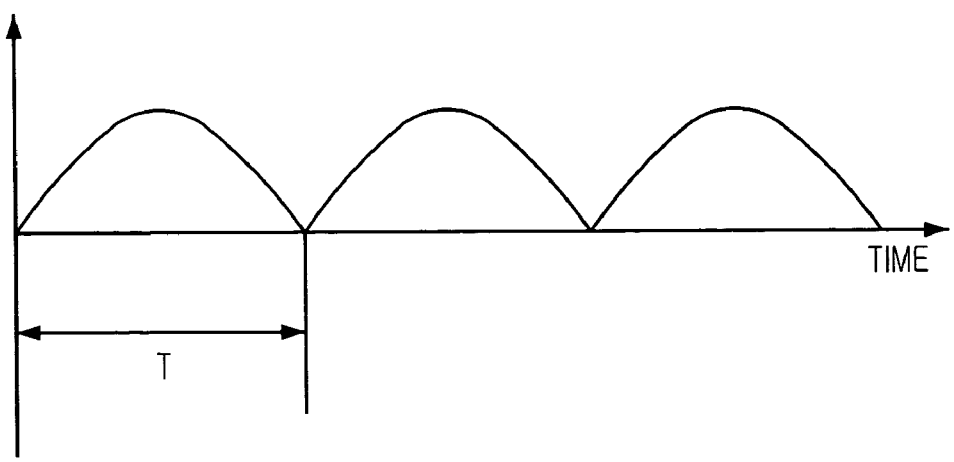
FIG. 2 provides a graph showing variation of the light strength to time of a discharge lamp such as a fluorescent lamp.

FIG. 2 provides a graph showing the variation of the light strength to time of a discharge lamp such as a fluorescent lamp. In FIG. 2, a horizontal axis represents lapse of time and a vertical axis depicts the strength of light sensed by a photo-diode.

As shown in FIG. 2, the light generated by the fluorescent lamp and detected by the photo-diode has a period, T, and is similar to a sine wave. In order to remove a flicker noise, it is required to know a frequency of a power source, and thus it is possible to remove the flicker noise by adjusting an integration time in integer times of the time corresponding to the frequency of the power source.

Usually, the frequency of the power source is 60 Hz or 50 Hz in most of countries. Therefore, the period of the fluorescent lamp becomes 1/120 Hz or 1/100 Hz as shown in FIG. 2.

In general, an FFT (Fast Fourier Transform) is a transform method transforming a signal to a frequency domain, which is conceived to simplify a repeated operation. The following equation EQ. 1 represents a general form of the FFT.

$$C_m = \sum_{k=0}^{k=N-1} Y_k e^{-j2\pi \cdot k \cdot m/N} (m = 0, 1, 2 \ldots N-1) \qquad \text{EQ. 1}$$

wherein $C_m$ represents a value for an image including a Fourier-transformed frequency component; k is the number of sampling times; N is an integer; and $Y_k$ is a scalar value of the Fourier-transformed image.

Figure 3:
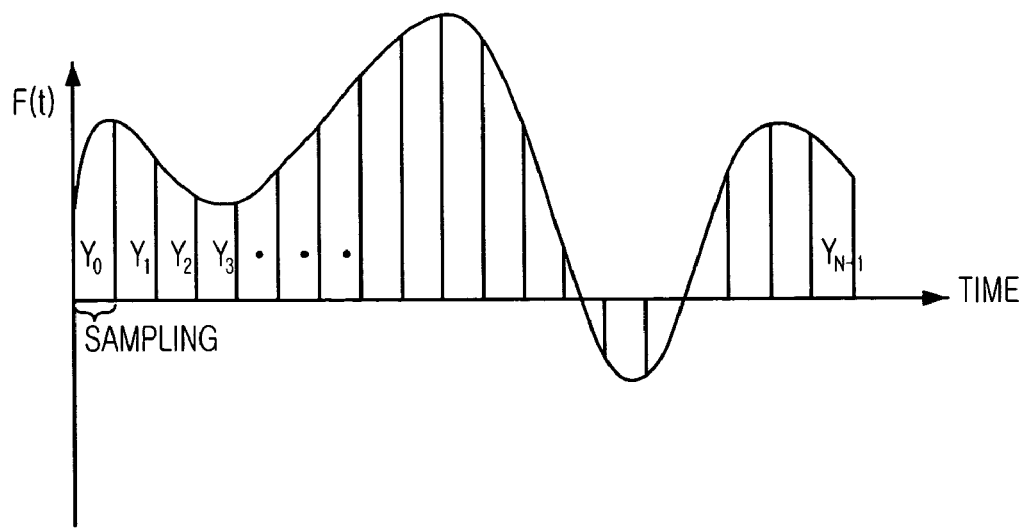
FIG. 3 is a graph representing a signal processing of FFT.

FIG. 3 is a graph representing the signal processing of the FFT and explains the equation EQ. 1 by using the graph.

With reference to FIG. 3, each of $Y_0, Y_1, Y_2 \ldots$, represents a sampled signal for each period of time and their sum is finally represented as a signal. However, since it is only determined whether or not there exist frequency components for flicker noise frequencies of 100 Hz and 120 Hz for a source power, it is not required to execute the equation EQ. 1 for all regions. As a result, the equation EQ. 1 is simplified to an equation EQ. 2.

$$C_m = \sum_{k=0}^{k=N-1} Y_k e^{-j2\pi \cdot k \cdot m/255} (m = \text{flicker noise frequency } (100, 120)) \qquad \text{EQ. 2}$$

Since equation EQ. 2 shows the sum of $Y_k$*coefficient practically, it is possible to design a frequency detecting block by using equation EQ. 2.

Figure 4:
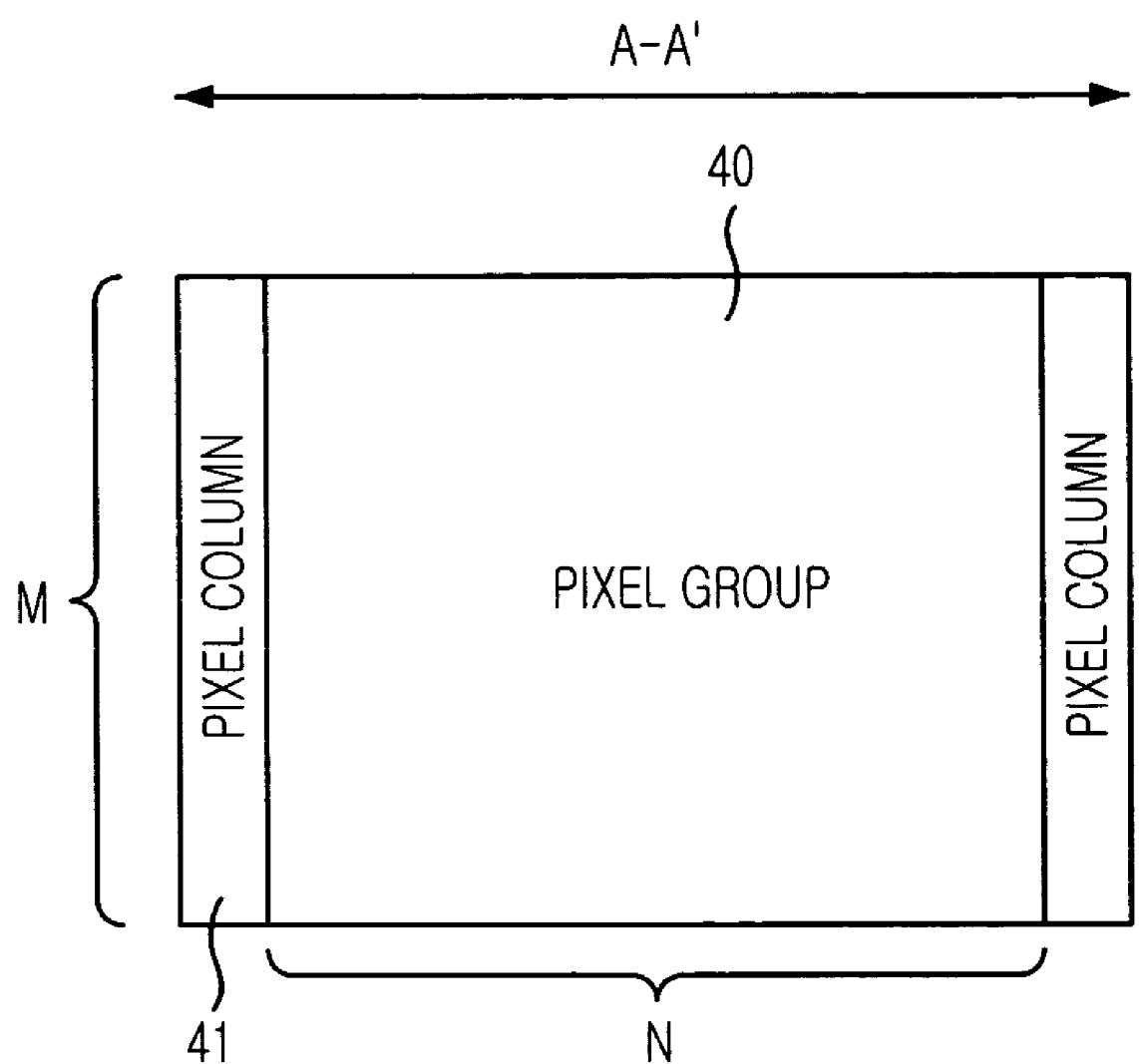
FIG. 4 is a cross-sectional diagram of a pixel array of an image sensor in accordance with an embodiment of the present invention.

FIG. 4 is a cross-sectional diagram of a pixel array of an image sensor in accordance with an embodiment of the present invention.

The disclosed pixel array includes a pixel group 40, e.g., a core pixel array, which has N×M number of unit pixels (N and M being integers) and detects image signals, and a pixel column 41 for detecting flicker noises, which is allocated along a row direction, A-A', of the pixel group 40 to detect an average frequency of a corresponding pixel row.

In FIG. 4, the pixel column 41 is allocated at each side of the pixel group 40. However, when the pixel column 41 is located at only one side of the pixel group 40, one of flicker noises of 100 Hz and 120 Hz is detected. On the other hand, when the pixel column 41 is located at both sides of the pixel group 40 as described in FIG. 4, both of 100 Hz and 120 Hz are detected.

If an appropriate signal is not detected, more than two pixel columns can be employed to adjust the number of pixels. However, in that case, the complexity of the circuit may be increased.

Meanwhile, it is possible to get better results when constructing the pixel column 41 to detect components of 50 Hz to 200 Hz after removing high frequency components.

Figure 5:
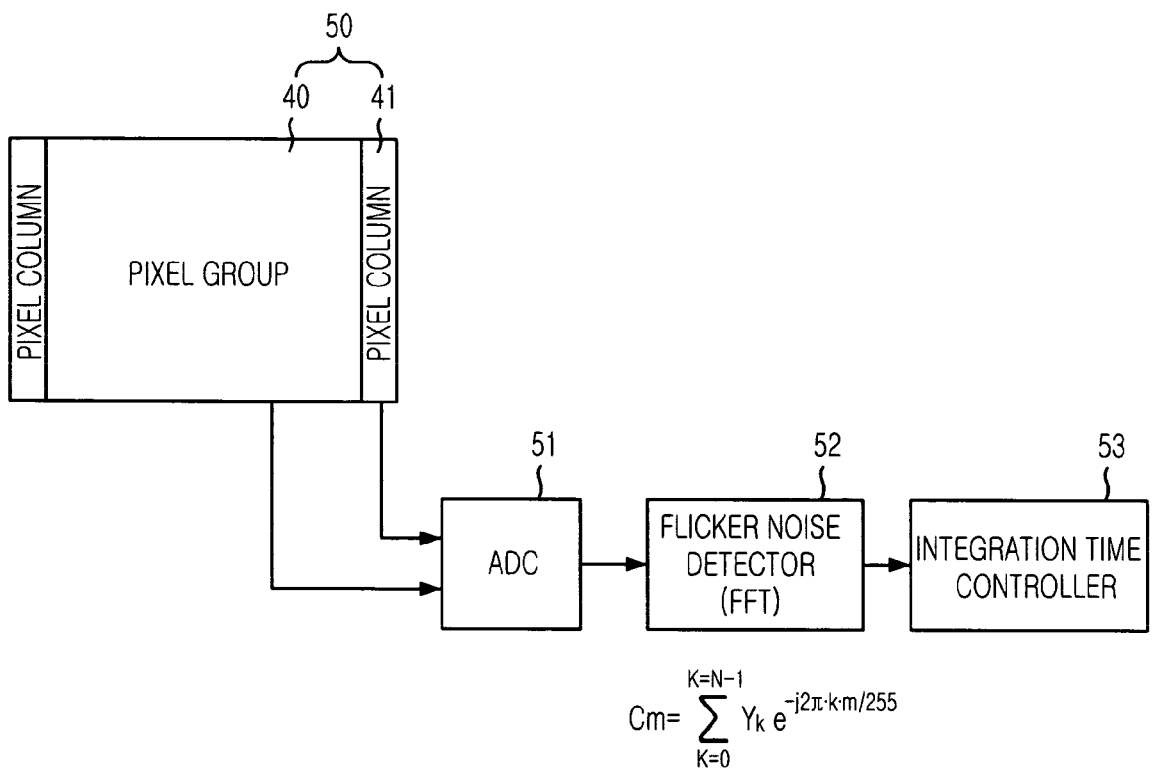
FIG. 5 is a block diagram of the image sensor for detecting a flicker noise in accordance with the present invention.

FIG. 5 shows a block diagram of the image sensor, which includes the pixel array in accordance with the present invention to thereby detect flicker noises.

In FIG. 5, the disclosed image sensor includes a pixel array 50, which contains a pixel group 40 employing N×M number of unit pixels for detecting an image signal and a flicker noise detecting pixel column 41 for detecting an average frequency of a corresponding pixel row and allocated along a row direction of the pixel group 40 to thereby detect a flicker noise, an analog to digital converter (ADC) 51 for converting an analog signal provided through the pixel array 50 to a digital signal, a flicker noise detector 52 which performs the FFT equation EQ. 2, has a coefficient m of the FFT equation EQ. 2, being a predetermined flicker noise frequency and corresponds to the pixel column 41 in one-to-one so as to detect a frequency component corresponding to a flicker noise from a digital-converted signal of the pixel column 41, and an integration time controller 53 for removing the flicker noise by adjusting the integration time of the pixel array 50 to a value corresponding to integer times of an inverse number of the flicker noise frequency since there exists the predetermined flicker noise frequency provided from the flick noise detector 52.

Hereinafter, the operation of the image sensor is explained in detail.

The pixel group 40 performs the image sensing for a fixed integration time and the pixel column 41 calculates an average frequency of each corresponding pixel row. The ADC 51 converts analog signals coupled from the pixel column 41 to digital signals. At this time, two pixel columns 41 integrate light in a period of a row access time and provide integrated light to the ADC 51. Namely, signals outputted from the fluorescent lamp are sampled in a fixed period and converted to digital signals.

The flicker noise detector 52 is a block of detecting frequency components. Thus, when 100 Hz or 120 Hz is detected, it is possible to remove an effect due to the flicker noises by sending the detected frequency components to the integration time controller 53 to adjust the integration period to integer times of 1/100 sec or 1/120 sec.

Figure 6:
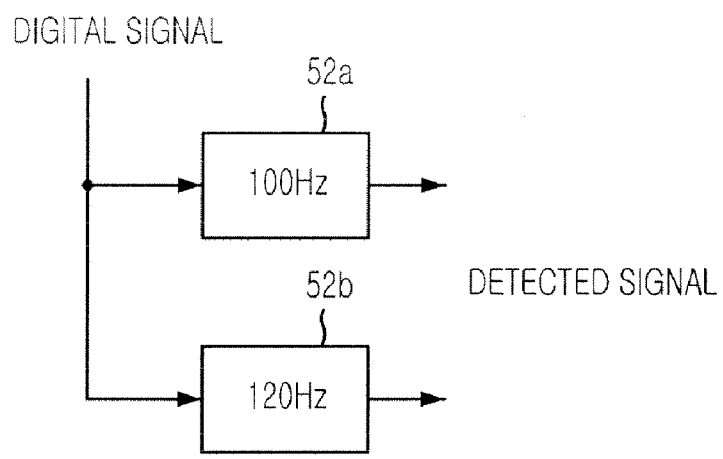
FIG. 6 describes a detailed block diagram of a flicker noise detector.

FIG. 6 describes a detailed block diagram of the flicker noise detector having unit flicker noise detecting units 52a and 52b for 100 Hz and 120 Hz, respectively.

Each of the flicker noise detecting units 52a and 52b is used to detect one flicker noise. Therefore, in order to detect another flicker noise having a different frequency from 100 Hz and 120 Hz, it is required to add another block corresponding to the different frequency and another pixel column to the pixel array.

Figure 7:
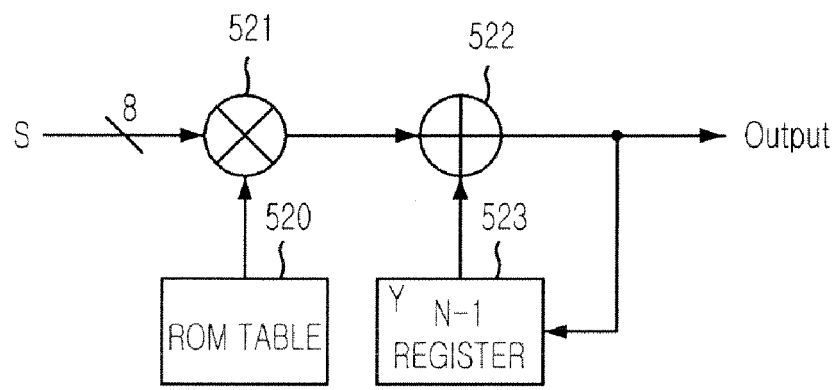
FIG. 7 shows a detailed circuit diagram of a unit flicker noise detecting unit.

FIG. 7 shows a detailed circuit diagram of the unit flicker noise detecting unit.

The unit flicker noise detecting unit has a ROM table 520 for storing a coefficient corresponding to a predetermined flicker noise frequency of a pixel column, e.g., 100 Hz or 120 Hz, to thereby perform the FFT of the equation EQ. 2, a multiplier 521 for executing multiplication of the FFT for the flicker noise frequency stored at the ROM table 520 and the digitally converted signal S of the pixel column, an adder 522 for summing up a current value provided from the multiplier 521 and a value determined at a previous sampling step and outputting the summed value, and a register 523 for making a loop of feeding back an output of the adder 522 to an input node of the adder 522 and storing an FFT value determined at the previous sampling step.

Herein, 'S' is a digitalized value of data of the pixel column provided from the ADC and the ROM table 520 stores pre-calculated values for the frequency detection. The unit flicker noise detecting unit outputs an appropriate value according to the amount of components of, e.g., 100 Hz or 120 Hz. Herein, an 8-bit ADC is used.

Figure 8:
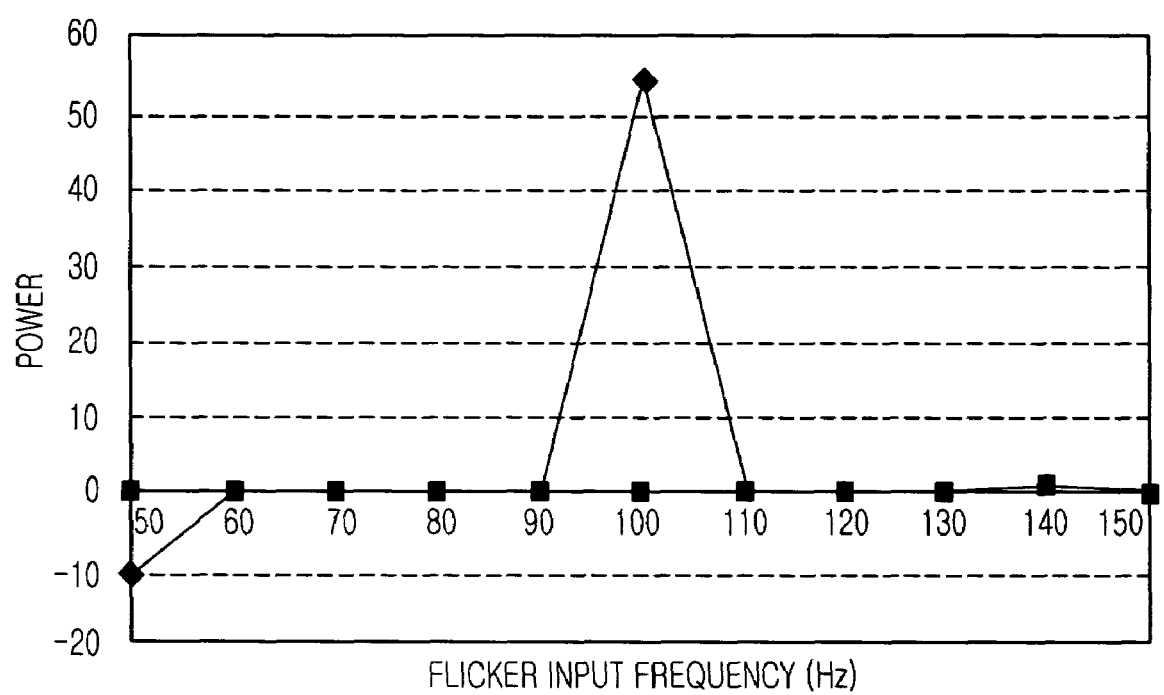
FIG. 8 depicts a graph describing outputs of the flicker noise detector corresponding to a predetermined flicker frequency.

FIG. 8 depicts a graph describing an output of the flicker noise detector to a predetermined flicker frequency. A horizontal axis represents an input frequency (Hz) and a vertical axis describes a frequency output (signal strength) corresponding to a flicker input frequency.

The graph shows simulation results for a frequency output, e.g., a flicker noise of 100 Hz. Therefore, it is noted that the flicker noise occurs at 100 Hz. In this case, when the integration time controller adjusts the integration time to a multiple of 1/100, the flicker noise corresponding to 100 Hz can be removed.

Herein, the larger frequency output represents that the frequency detection characteristic is excellent. At this time, in order to use the frequency output for removing the flicker noise since the frequency output is represented as a numerical value, it is required to designate a threshold value so as to distinguish the frequency output with image information. Through this, it is possible to obtain more accurate result.

FIG. 9 is a flow chart showing a method of removing a flicker noise of the image sensor in accordance with the present invention.

With reference to FIG. 9, the flicker noise removing method is explained in detail.

At first, in step 90, the light is integrated for a fixed integration time at the image sensor which includes, as shown in FIG. 4, the pixel array having the pixel group for the image sensing and the pixel column allocated along a row direction of the pixel group to detect the flicker noise.

In step 91, the pixel group is provided with an image signal, i.e., performs the imaging and the pixel column calculates an average frequency for its corresponding pixel rows.

In step 92, the calculated average frequency is converted to a digital value and, thus, the signal sensed by the pixel group is converted to a digital signal simultaneously.

In step 93, in order to detect a frequency component corresponding to a flicker noise from the digital-converted signal of the pixel column, the FFT of EQ. 2 is executed for a predetermined flicker noise to thereby detect the flicker noise.

At this time, as a preset flicker noise frequency is obtained through the calculation in the step 93, the flicker noise is removed by adjusting the integration time of the pixel array to a value corresponding to integer times of an inverse value of the flicker noise frequency in step 94.

In the calculating process for the FFT equation, a coefficient corresponding to the preset flicker noise frequency and the digital-converted signal of the pixel column are multiplied by the FFT equation and, then, a multiplied current value and a previous value are added and outputted. At the same time, the outputted value is stored for the next calculation.

That is, in accordance with the present invention, the average frequency is detected from the pixel column and converted to the digital signal. Then, the flicker noise is detected through the FFT and the integration time is changed. As a result, the flicker noise caused by the power source can be removed.

Through the use of the present invention, it is possible to remove the flicker noise represented in the form of banding noise at a practical image sensor and to prevent the image quality degradation of the image sensor due to the flicker noise effectively. Thus, there is obtained an advantage of substantially improve the performance of the image sensor.

While the present invention has been described with respect to the particular embodiments, it will be apparent to those skilled in the art that various changes and modifications may be made without departing from the spirit and scope of the invention as defined in the following claims.

What is claimed is:

1. An image sensor, comprising:
   a pixel array including a pixel group which has N×M number of unit pixels and detects an image signal and a pixel column, allocated along a row direction of the pixel group, for detecting an average frequency of a corresponding pixel row to thereby detect a flicker noise;
   an analog-to-digital converting means for converting an analog signal provided from the pixel array to a digital signal;
   a flicker noise detecting means for performing the following equation and having a coefficient m of the following FFT equation, which is a predetermined flicker noise frequency corresponding to the pixel column in one-to-one, thereby detecting a frequency component corresponding to the flicker noise from the digital signal, $$C_m = \sum_{k=0}^{L-1} Y_k e^{\frac{-j2\pi \cdot k \cdot m}{2^L - 1}} \quad (m = \text{flicker noise frequency})$$

wherein Cm represents a value of the pixel column including a Fourier-transformed frequency component; k is the number of sampling times; L is a bit number of the digital signal of the analog-to-digital converting means; and Yk is a scalar value of the Fourier-transformed pixel column; and
   an integration time control means for removing the flicker noise by adjusting the integration time of the pixel array to a value corresponding to integer times of an inverse number of the frequency component since there exists the predetermined flicker noise frequency provided from the flicker noise detecting means.

2. The image sensor of claim 1, wherein the pixel column includes P number of columns allocated at both sides of the pixel group in the row direction, P being larger than 1.

3. The image sensor of claim 2, wherein the pixel column is constructed to detect only one frequency component in a range of 50 Hz to 200 Hz.

4. The image sensor of claim 1, wherein a frequency of the flicker noise is 100 Hz or 120 Hz.

5. The image sensor of claim 1, wherein the flicker noise detecting means includes:
   a ROM table storing the coefficient corresponding to the predetermined flicker noise frequency of the pixel column, thereby performing the FFT equation;
   a multiplier for executing multiplication of the FFT equation for the flicker noise frequency stored at the ROM table and the digital signal of the pixel column;
   an adder for summing up a current value provided from the multiplier and a value determined at a previous sampling step and outputting a summed value; and
   a register for making a loop of feeding back an output of the adder to an input node of the adder and storing the value decided at the previous sampling step.

6. A method for removing a flicker noise of an image sensor, which includes a pixel array having a pixel group for image sensing and a pixel column allocated along a row direction of the pixel group so as to detect the flicker noise, comprising the steps of:
   (a) calculating an average frequency for a corresponding pixel row from the pixel column;
   (b) converting the average frequency to a digital signal;
   (c) performing the following equation for a predetermined flicker noise so as to detect a frequency component corresponding to the flicker noise from the digital signal, $$C_m = \sum_{k=0}^{L-1} Y_k e^{\frac{-j2\pi \cdot k \cdot m}{2^L - 1}} \quad (m = \text{flicker noise frequency})$$

wherein Cm represents a value of the pixel column including a Fourier-transformed frequency component; k is the number of sampling times; L is a bit number of the digital signal of the analog-to-digital convening means; and Yk is a scalar value of the Fourier-transformed pixel column; and
   (d) removing the flicker noise by adjusting the integration time of the pixel array to a value corresponding to integer times of an inverse number of the frequency component since there exists the predetermined flicker noise frequency.

7. The method as recited in claim 6, wherein the step (c) includes the steps of:
   (c1) multiplying the coefficient corresponding to the predetermined flicker noise frequency and the digital signal of the pixel column by using the FFT equation; and
   (c2) summing up a current multiplied value and a previous multiplied value to thereby output a summed value.

8. The method as recited in claim 7, wherein, in the step (c2), the summed value is stored for the next summing step at the same time of being outputted.

9. The method as recited in claim 6, wherein, in the step (b), the signal sensed by the pixel group is also convened to a digital signal.

* * * * *